United States Patent [19]
Lhomer et al.

[11] Patent Number: 5,566,713
[45] Date of Patent: Oct. 22, 1996

[54] GAS DISPENSING CONTROL ASSEMBLY AND GAS BOTTLE EQUIPPED WITH SUCH AN ASSEMBLY

[75] Inventors: Gerard Lhomer, Le Mesnil Saint Denis; Gilbert Theurant, Vitry sur Seine, both of France

[73] Assignee: TAEMA, Antony, France

[21] Appl. No.: 253,096

[22] Filed: Jun. 2, 1994

[30] Foreign Application Priority Data

Jun. 3, 1993 [FR] France ................... 93.06646

[51] Int. Cl.⁶ ............ F16K 31/44; F16K 51/00
[52] U.S. Cl. ............ 137/613; 137/505.25; 137/509; 137/614.19
[58] Field of Search ............ 137/613, 881, 137/614.2, 505.25, 883, 614.19, 509

[56] References Cited

U.S. PATENT DOCUMENTS

| | | | |
|---|---|---|---|
| 3,269,411 | 8/1966 | Teston | 137/505.25 X |
| 3,407,841 | 10/1968 | Semon | 137/505.25 X |
| 3,885,589 | 5/1975 | Iung | 137/613 |
| 4,484,695 | 11/1984 | Fallon et al. | 137/881 X |
| 4,572,477 | 2/1986 | Phlipot et al. | |
| 4,586,634 | 5/1986 | Minter et al. | |
| 4,702,277 | 10/1987 | Ollivier | 137/613 |
| 4,763,690 | 8/1988 | Martin | 137/613 |
| 4,782,861 | 11/1988 | Ross | |
| 4,898,210 | 2/1990 | Nitta | 137/614.19 |
| 5,127,436 | 7/1992 | Campion et al. | 137/614.19 X |
| 5,135,023 | 8/1992 | Ross | 137/505.25 X |
| 5,232,019 | 8/1993 | Wolff et al. | 137/613 X |

FOREIGN PATENT DOCUMENTS 28732  9/1977  Australia .

Primary Examiner—Kevin Lee

[57] ABSTRACT

The gas control and dispensing assembly comprises a lower block (1), mounted on a gas bottle (4) and comprising a manometer (9) and a filling connector (11), and on which a subassembly (32, 17) is permanently mounted, axially movable in response to a rotation of a tubular control and actuation member (46) surrounding the subassembly, which contains a pressure reducer (27) and an indexable flow regulator (34, 35) and has a low-pressure outlet (45) and a medium-pressure outlet (51).

Application in particular to dispensing medical oxygen.

18 Claims, 2 Drawing Sheets

GAS DISPENSING CONTROL ASSEMBLY AND GAS BOTTLE EQUIPPED WITH SUCH AN ASSEMBLY

The invention relates to a gas control and dispensing assembly, intended to be connected to a tank containing the said 9as under a high pressure, comprising a low-pressure outlet and, in series between the tank and the low-pressure outlet, a shut-off valve exposed to the high pressure, a pressure reducer means couplable to the shut-off valve and a flow regulator means.

The object of the present invention is to provide such a control and dispensing assembly which is in a compact and ergonomic unit form, typically permanently mounted on the gas tank or bottle and providing all the functional and safety features required, both for dispensing gas and for filling the tank.

For this purpose, according to one aspect of the invention, the low-pressure outlet, the flow regulator means and the pressure reducer means are assembled in a first mobile subassembly arranged in a control and actuation structure solidly attached to a second subassembly incorporating the shut-off valve and typically mounted directly on the tank.

According to other characteristics of the invention, the first subassembly comprises a second medium-pressure gas outlet upstream of the flow regulator means;

the pressure reducer means is arranged in a first block slidingly interacting with a first end of the second subassembly and comprising a hollow rod portion selectively interacting with the shut-off valve;

the pressure regulator means comprises a piston means, supporting the valve, sliding in the first block and interacting with a valve seat formed by this first block;

the flow regulator means and the low-pressure outlet are arranged in a second block mounted on the first block;

the control and actuation structure comprises a tubular member containing the first subassembly and having, in its side wall, a first cut-out and a second cut-out through which the low-pressure and medium-pressure outlets respectively extend, advantageously on one and the same side of the first subassembly, the second cut-out typically forming a cam profile interacting with the medium-pressure outlet in order axially to move the first subassembly in response to a rotation of the tubular member.

The present invention also relates to a gas bottle permanently equipped with such a unit assembly.

Other characteristics and advantages of the present invention will emerge from the following description of an embodiment, given by way of illustration but in no way limitingly, made with respect to the attached drawings, in which:

DETAILED DESCRIPTION OF CERTAIN PREFERRED EMBODIMENTS

Figure 1:
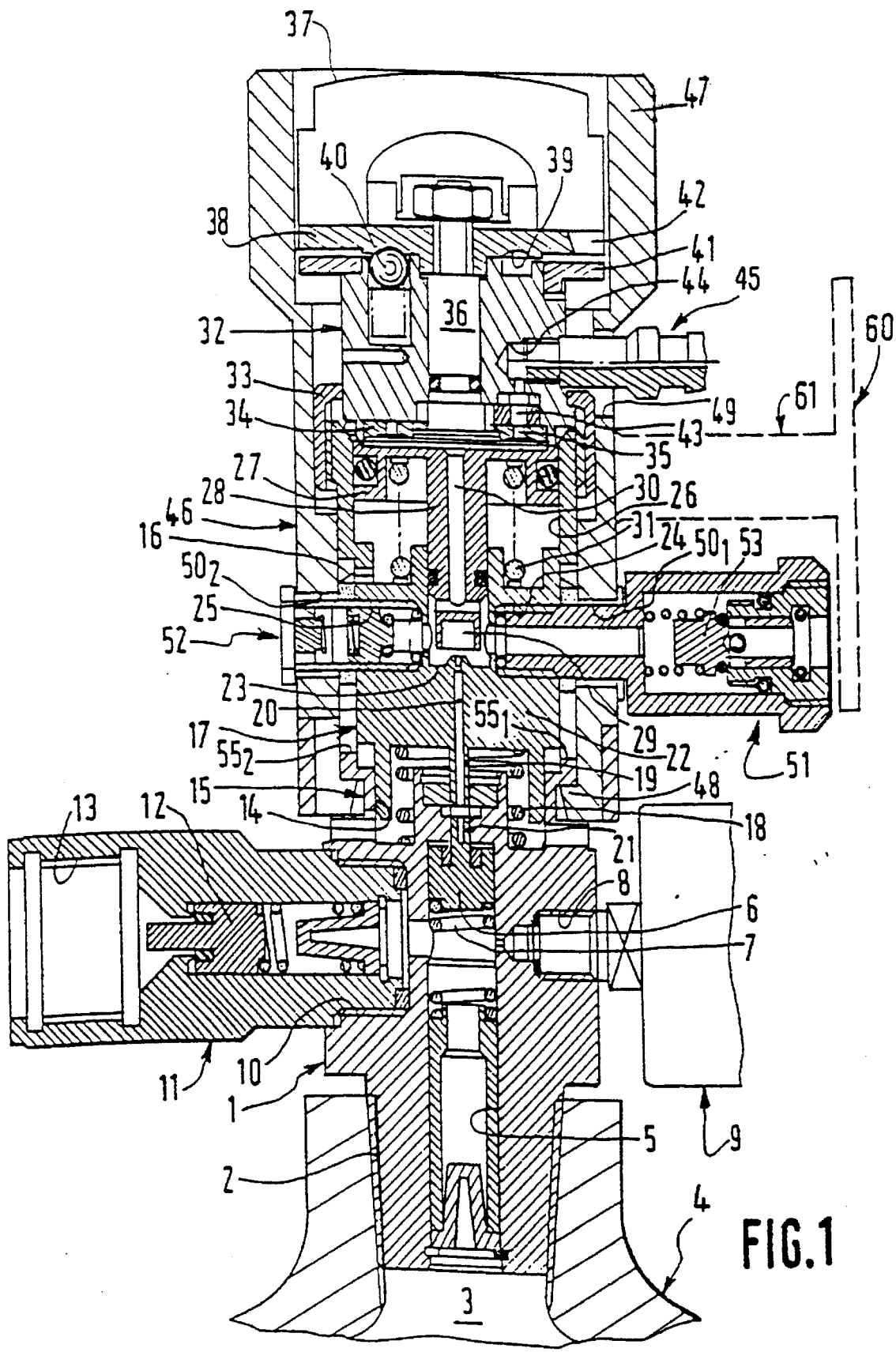
FIG. 1 represents, in longitudinal section, a gas control and dispensing assembly according to the invention mounted in place on a gas bottle.

In the embodiments represented, an assembly according to the invention typically comprises a lower block, generally denoted by the reference 1, comprising a frustoconical lower end 2 threaded for mounting it in the tapped opening 3 of a neck of a gas bottle 4, for example a pressurized medical oxygen bottle. The lower block 1 comprises a bore 5 extending over most of the length of the block 1 and emerging downwards, in which a shut-off valve 6 and its spring are arranged, the latter normally pushing the valve 6 into a closure position preventing outward flow of the gas in the bottle 4. A first transverse stepped bore 8 and a second transverse stepped bore 10 emerge in the bore 5, the transverse stepped bore first 8 being used for mounting a manometer indicating the pressure in the bottle 4, and the second transverse stepped bore 10 being used for mounting a filling connector 11 containing a non-return valve 12 and advantageously comprising a tapped entry bore 13 used for receiving a rapid-attachment connector with externally threaded claws and fitted with means (for example, inlet bore with diameter smaller than the tapped bore 13) preventing the use of a connector other than the connector with specific claws. The upper part of the block 1 comprises a bore 14, a peripheral groove 15 and forms an end skirt terminating in a chamfer comprising two diametrically opposite axial slots $55_1$ and $55_2$.

The bore 14 receives a skirt-shaped end of a cylindrical intermediate block 17 enclosing a spring 18 bearing on the bottom of the bore 14 and which comprises a central hollow rod portion 19 defining a central passage 20 and extending downwards in a central small-diameter bore 21 of the block 1 in which a hollow rod portion also extends, in front of the shut-off valve 6. The passage 20 emerges upwards in a small frustoconical protuberance forming a valve seat 22 in the bottom of a widened central bore 23 of the block 17, in which two opposite transverse bores 24 and 25 emerge. The upper end of the block 17 widens in the form of a skirt, forming an upper bore 26 in which a piston 27 is mounted with leaktight sliding, this piston comprising a central rod 28 received with leaktight sliding in the bore 23 and carrying, at its end, a valve gasket 29 intended to interact with the seat 22. The upper face of the piston 27 is exposed to the pressure prevailing in the lower part of the bore 23 via an inner passage 30 extending in the rod 28, the piston 27 being pushed away from the seat 22 by a calibrated spring 31 bearing in the bottom of the bore 26.

The bore 26 is closed, at its upper part, by an upper block 32 mounted in a leaktight manner on the intermediate block 17 by means of a nut 33. A disc 34 is arranged in a cylindrical housing at the lower end of the block 32, this disc being provided with a series of through holes 35 which have different dimensions and are distributed angularly., The disc 34 can be moved angularly with respect to the upper block 32 by a manual actuation device comprising a central rod 36 passing axially in a leaktight manner through the block 32, coupled in rotation with the disc 34 and having its upper end solidly attached to an actuation member, typically a diametral end web 37 integral with an indexing disc 38 overhanging the block 32 and comprising, in its lower face, a series of angularly distributed housings 39 intended to interact with a ball 40 pressed elastically outwards and mounted in the block 32. Advantageously, the block 32 carries, at its upper end, an indicator disc 41 parallel to the disc 38 and carrying angularly distributed markers, visible by virtue of a slot 42 made in the disc 38. The upper block 32 comprises an axial passage 43 which emerges in the housing of the disc 34 and with which a transverse bore 44 communicates, used for mounting a low-pressure outlet connector 45, typically a notched knob.

The subassembly constituted by the blocks 17 and 32 is arranged in a tubular member 46 comprising an upper part 47, shaped with notches in order to facilitate actuation and enclosing the disc 41 and its actuation web 37, and a lower end consisting of a series of axial claws 48, distributed angularly and each comprising an internal protuberance with frustoconical internal profile, intended to interact with the frustoconical ramp-shaped end 16 of the lower block 1 for mounting the tubular member 46 on the lower block 1 by permanently engaging the claws 48 in the peripheral groove 15 in order thus solidly to attach the tubular member 46 and its internal subassembly irremovably to the lower block 1, whilst allowing the tubular member 46 to turn with respect to the block 1, about their common axis.

The tubular member 46 comprises, in its side wall, an upper cut-out 49 through which the low-pressure connector 45 extends freely, as well as two opposite symmetrical cut-outs or apertures $50_1$ and $50_2$, each having a transverse cam profile and having an axial extension matching the diameter of an intermediate portion of a medium-pressure connector 51 and a surge valve device 52, respectively, mounted opposite in the transverse bores 24 and 25 of an intermediate block 17 and passing through the apertures $50_1$ and $50_2$ of the tubular actuation member 46 and the axial slots $55_1$ and $55_2$ of the upper end skirt of the block 1. The medium-pressure connector 51 typically comprises a non-return valve 53 which is pushed back during connection to a utilization pipe.

The operation of the assembly which has just been described is as follows:

Starting from the normal closure position represented in FIG. 1 the tubular member 46 is actuated in rotation with respect to the rest of the assembly so as to cause, by interaction between the cam surfaces of the cut-outs $50_1$ and $50_2$ and the associated connectors 51 and 45, a downward movement, against the spring 18, of the subassembly constituted by the blocks 17 and 32. This movement causes opening of the shut-off valve 6, pushed back by the central rod portion 19 of the lower block 17. The high pressure prevailing in the bottle 4, for example of the order of $200 \times 10^5$ Pa is reduced, in the lower part of the bore 23, to a mediumpressure, for example of the order of $3.5 \times 10^5$ Pa for medical applications, by the pressure-reducer piston 27, as a function of the calibration force of the spring 31. The user is therefore provided, at the outlet of the connector 51, with a medium-pressure gas available at high flow rate, for example of the order of 50 to 60 liters/minute for medical applications. In parallel, as a function of the orifice 35 selected by rotating the disc 34, the user is provided, at the low-pressure outlet connector 45, with a lower pressure, typically slightly greater than atmospheric pressure for normal flow rates, over a range of flow rates varying, depending on the setting of the flow regulator 34, 35, typically, for medical applications, by whole liter increments from 0 to 15 liters/minute, as is suited for oxygen-therapy masks or goggles in home care or for the emergency services. The risks of overpressure at the outlets 51 and 45 are eliminated by virtue of the surge valve 52 which, under the abovementioned conditions, is calibrated so as to open when the pressure in the bore 23 exceeds $5 \times 10^5$ Pa, for example.

It will be understood, from the preceding description, that the unit assembly according to the invention, typically delivered with the gas bottle 4, allows the user to be provided, by simple rotational actuation of two juxtaposed elements (47, 37) arranged at the end of the assembly, and therefore easily accessible through the top of a cover or bell for protecting the assembly, mounted on the bottle 4, with a gas flow preselected as desired and furthermore, optionally, with another medium-pressure gas outlet suitable in particular for respirators in hospital environment and at home, the availability of the gas in the bottle being continuously monitorable by the manometer 9. Once the gas reserve is exhausted, the user disconnects the assembly from its installation and returns the bottle and its gas control and dispensing assembly to the supplier who, using special tooling in his possession, can refill the bottle simply, without dismounting the assembly, through the filling connector 11.

According to an aspect of the invention, suitable most particularly for transportable gas bottles, the utility outlets 45 and 51 and the manometer 9 are arranged, in line, on one and the same side of the unit assembly, facing a side opening formed in the protective cover.

Figure 2:
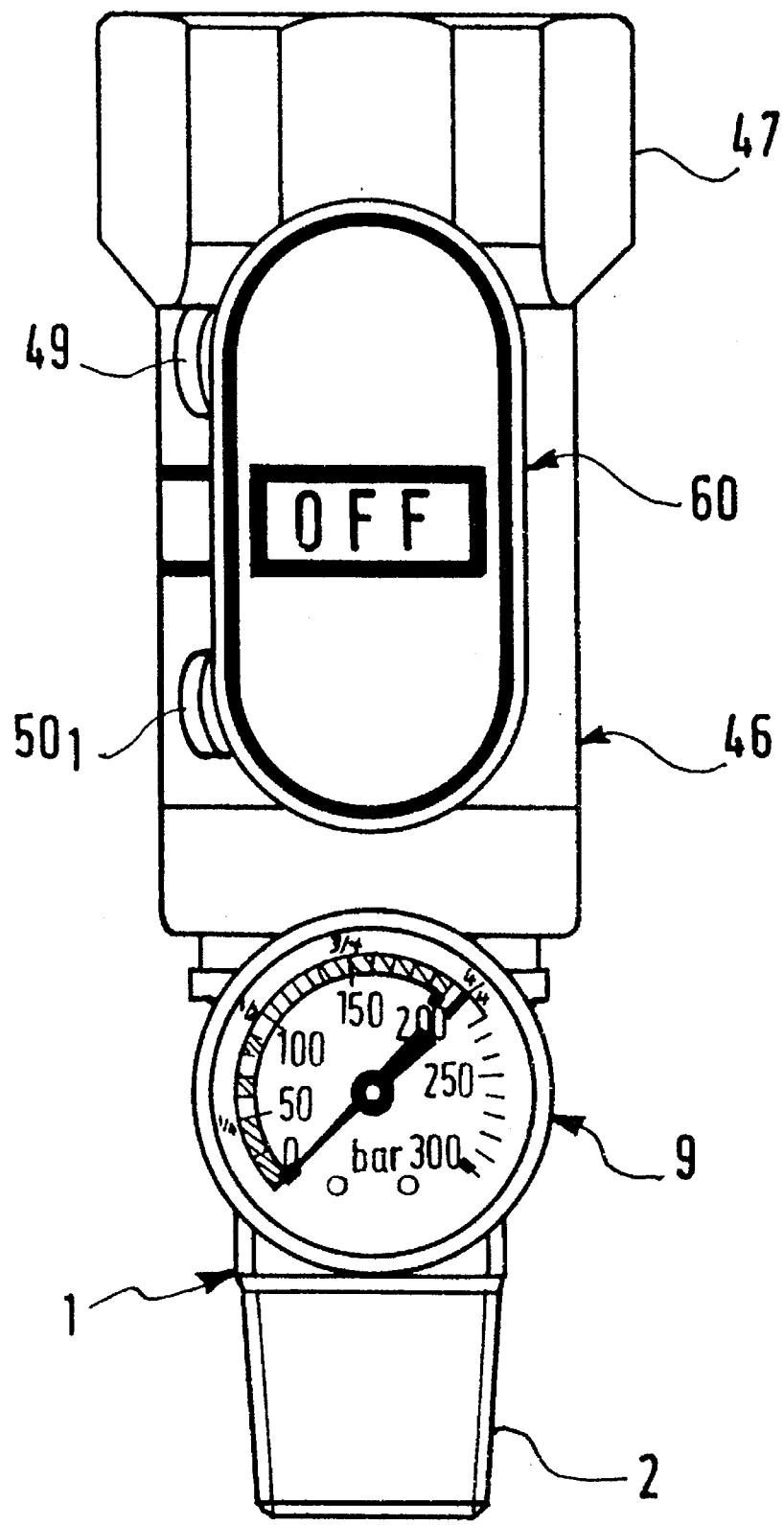
FIG. 2 is a side view of the assembly provided with a safety flap represented in broken lines in FIG. 1.

As shown in FIG. 2 and in broken lines in FIG. 1, the assembly is then advantageously supplemented by a "flag" consisting of a flap 60 solidly attached, via a rod 61, to the tubular member 46. The rod 61 extends between the connectors 45 and 51, the base of the rod 61 being located between the regions closest to the upper part 47, or top regions, of the slots 49 and $50_1$, and the flap 60 has a longitudinal extension such that, in the closure position of the assembly, it masks the two connectors 45 and 51, thus preventing connection of the pipes onto a "closed" assembly, so long as this flag flap, in this position, blocks the essential part of the access opening formed in the cover of the bottle. Conversely, in the "open" position of the assembly, the flap, which also allows actuation of the tubular member 46, is almost entirely hidden in the cover of the bottle, giving free access to the connectors 45 and 51, thus guaranteeing that the pipes joining there are connected to the pressurized-fluid source in the container, which is important for medical applications. Most of the constituent elements of the assembly are made of metal, typically of brass and steel for the springs, the tubular member 46, and typically the flap 60, being made of plastic, for example a polyamide.

Although the present invention has been described with reference to a particular embodiment, it is in no way limited thereby but moreover may receive modifications and variants which are apparent to the person skilled in the art. It finds applications in a very large number of fields using gases packed under pressure, especially in welding/cutting.

What is claimed is:

1. Gas control and dispensing assembly for connection to a tank containing said gas under high pressure, comprising a first gas outlet, a shut-off valve connected in series between the tank and the first gas outlet and being exposed to said high pressure, pressure reducer means coupled to said shut-off valve for reducing the pressure of gas flowing to said first gas outlet, and a flow regulator, said flow regulator and said pressure reducer means being assembled in a first mobile subassembly arranged in a control and actuation structure securely attached but moveable with respect to a second subassembly which incorporates said shut-off valve.

2. Gas control and dispensing assembly for connection to a tank containing gas under high pressure, comprising a first gas outlet, a shut-off valve connected in series between the tank and the first gas outlet and being exposed to said high pressure, pressure reducer means couplable to said shut-off valve, and a flow regulator, said flow regulator and said pressure reducer means being assembled in a first mobile subassembly which includes a second gas outlet upstream of said flow regulator, and first mobile subassembly being arranged in a control add actuation structure solidly attached to a second subassembly which incorporates said shut-off valve.

3. Assembly according to claim 2 wherein said control and actuation structure comprises a tubular member containing said first mobile subassembly and having, in a side wall, a first cut-out and a second cut-out through which said second gas outlet and said second gas outlet respectively extend.

4. Assembly according to claim 3 wherein said flow regulator means comprises an actuation member arranged in an actuation end of said tubular member.

5. Assembly according to claim 3 wherein said second cut-out forms a cam profile interacting with said second gas outlet to move said first mobile subassembly axially in response to a rotation of said tubular member.

6. Assembly according to claim 5 wherein said pressure reducer means is arranged in a first block slidingly interacting with a first end of said second subassembly and comprising a hollow rod portion selectively interacting with said shut-off valve; and surge valve means mounted in said first block, a third cut-out formed in the side wall of said tubular member and having a cam profile, said surge valve device being operable to assist the axial movement of said first mobile subassembly in response to said rotation of said tubular member.

7. Assembly according to claim 3 wherein said tubular member comprises, at one end, radial protuberances received in a peripheral groove of a first end of said second subassembly.

8. Assembly according to claim 2 wherein said second subassembly comprises a tubular block having a second end provided with means for mounting on the tank.

9. Assembly according to claim 8 wherein said second subassembly further comprises a filling device with a non-return valve emerging in said tubular block upstream of said shut-off valve to allow the tank to be filled.

10. Assembly according to claim 8 wherein said second subassembly further comprises a manometer mounted in said tubular block.

11. Assembly according to claim 10 wherein the manometer, the low-pressure outlet and the medium-pressure outlet are arranged on one and the same side of the assembly.

12. Assembly according to claim 8 wherein the tank is a gas bottle, having a neck, and the second end of the tubular block is threaded for mounting in said neck of the gas bottle.

13. Gas control dispensing assembly for connection to a tank containing gas under high pressure, comprising a first gas outlet, a shutoff valve connected in series between the tank and the first gas outlet and being exposed to said high pressure, pressure reducer means couplable to said shut-off valve, a flow regulator, said flow regulator and said pressure reducer means being assembled in a first mobile subassembly arranged in a control and actuation structure solidly attached to a second subassembly which incorporates said shut-off valve, and wherein said pressure reducer means is arranged in a first block slidingly interacting with a first end of said second subassembly and comprising a hollow rod portion selectively interacting with said shut-off valve.

14. Assembly according to claim 13, wherein said pressure reducer means comprises a valve, piston means supporting said valve and slidable in said first block and interacting with a valve seat formed in said first block.

15. Assembly according to claim 13 wherein said flow regulator and said first gas outlet are arranged in a second block mounted on said first block.

16. Assembly according to claim 15 wherein said flow regulator comprises a disc with calibrated holes, said disc being positioned in rotation with respect to said second block.

17. A gas bottle containing gas under a high pressure and equipped with a gas control and dispensing assembly connected thereto and having a first gas outlet, a shut-off valve connected in series between the bottle and the first gas outlet, pressure reducer means couplable to said shut-off valve, a flow regulator, said first gas outlet, said flow regulator and said pressure reducer means being assembled in a first mobile subassembly arranged in a control and actuation structure solidly attached to a second subassembly which incorporates said shut-off valve, said first mobile subassembly including a second gas outlet upstream of said flow regulator and said second subassembly comprising a tubular block having a second end provided with means for mounting on said gas bottle.

18. The gas bottle of claim 17 wherein said gas is oxygen.

* * * * *

UNITED STATES PATENT AND TRADEMARK OFFICE
CERTIFICATE OF CORRECTION

PATENT NO. : 5,566,713
DATED : Oct. 22, 1996
INVENTOR(S) : Lhomer et al.

It is certified that error appears in the above-indentified patent and that said Letters Patent is hereby corrected as shown below:

Claim 1, line 2 (Column 4, line 44): Delete "said".

Claim 2, line 10 (Column 4, line 63): Change "add" to —and—.

Signed and Sealed this

Seventh Day of January, 1997

Attest:

BRUCE LEHMAN

*Attesting Officer*  Commissioner of Patents and Trademarks